(12) United States Patent
Miller et al.

(10) Patent No.: US 8,418,232 B2
(45) Date of Patent: Apr. 9, 2013

(54) EXTENSIBLE PERMISSIONS FOR ADMINISTRATIVE AND TARGET PERMISSIONS

(75) Inventors: James L. Miller, Lombard, IL (US); Senthivel Saravanan, San Jose, CA (US)

(73) Assignee: Aspect Software, Inc., Chelmsford, MA (US)

( * ) Notice: Subject to any disclaimer, the term of this patent is extended or adjusted under 35 U.S.C. 154(b) by 773 days.

(21) Appl. No.: 12/044,735

(22) Filed: Mar. 7, 2008

(65) Prior Publication Data
US 2009/0228958 A1 Sep. 10, 2009

(51) Int. Cl.
*G06F 7/04* (2006.01)
(52) U.S. Cl. .......................................................... 726/4
(58) Field of Classification Search ................... 709/202; 726/4
See application file for complete search history.

(56) References Cited

U.S. PATENT DOCUMENTS

| | | | |
|---|---|---|---|
| 7,171,468 B2 * | 1/2007 | Yeung et al. | 709/225 |
| 7,716,077 B1 * | 5/2010 | Mikurak | 705/8 |
| 2003/0046260 A1 * | 3/2003 | Satyanarayanan et al. | 707/1 |
| 2007/0016939 A1 * | 1/2007 | Leibovitz et al. | 726/3 |
| 2007/0250492 A1 * | 10/2007 | Angel et al. | 707/4 |
| 2008/0226059 A1 * | 9/2008 | Shaffer et al. | 379/266.05 |
| 2009/0164649 A1 * | 6/2009 | Kawato | 709/229 |

* cited by examiner

*Primary Examiner* — Kambiz Zand
*Assistant Examiner* — Abiy Getachew
(74) *Attorney, Agent, or Firm* — Husch Blackwell LLP

(57) ABSTRACT

A method and apparatus for providing resource access to a user within a computer network of the automatic contact distribution system. The method includes the steps of providing a permission set that defines a limited set of features within the computer network that the user can access, the user signing into the computer network of the automatic call distribution system, the system retrieving the permission set for the user and the system providing the user with limited access to the computer system based upon the permission set.

29 Claims, 1 Drawing Sheet

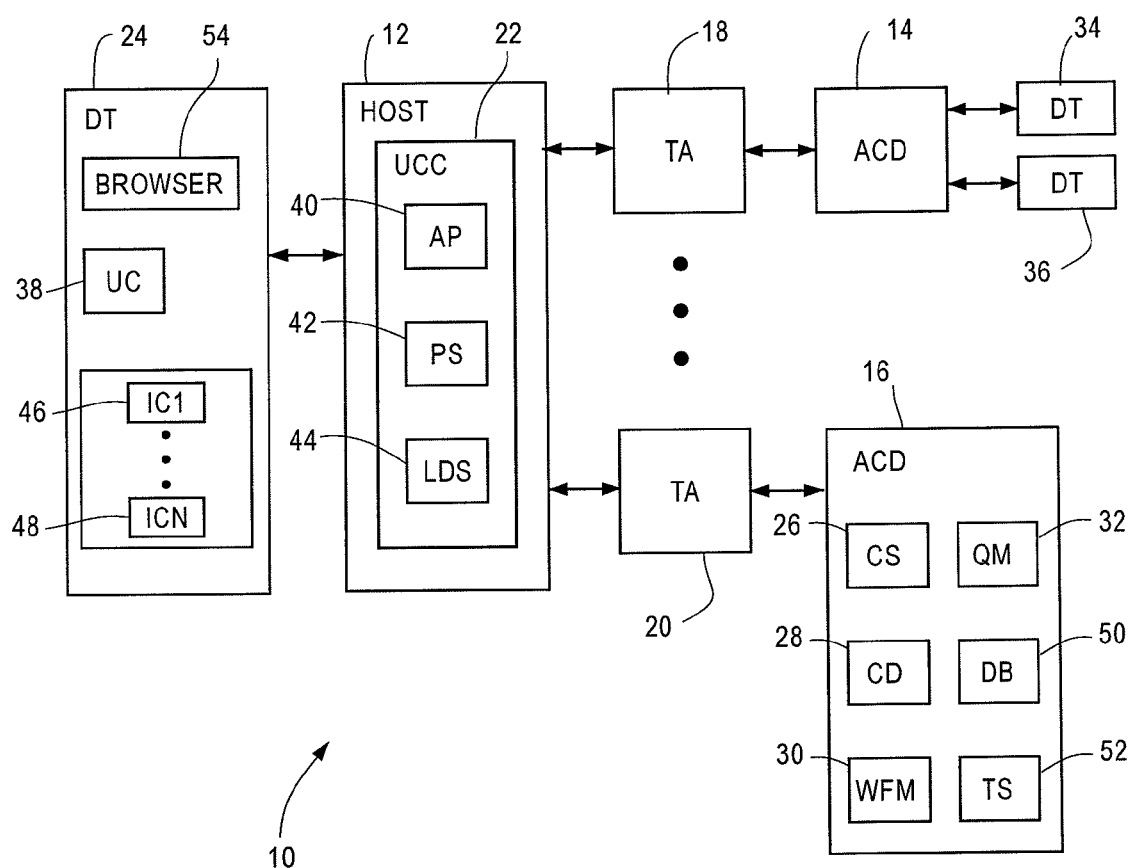

EXTENSIBLE PERMISSIONS FOR ADMINISTRATIVE AND TARGET PERMISSIONS

FIELD OF THE INVENTION

The field of the invention relates to computer systems and more particularly to interconnected computer systems.

BACKGROUND OF THE INVENTION

The difficulty of providing access to users within interconnected computer systems is generally known. One or more interconnected computers are typically required whenever the task is too large for a single computer or where specific tasks are provided by different independent systems and the activities of the computers must be coordinated.

Automatic call distributors (ACDs) are an example of such a situation. ACDs are typically used by telemarketers and/or service providers and are typically provided with a host computer that makes and receives calls.

Within the ACD, workforce management, and performance optimization systems (operating within an ACD or otherwise) are examples of the different tasks that may be distributed over a number of hosts. In addition to making and receiving calls, the host of an ACD may also act as a repository of customer records.

In order to reduce telephone costs, telemarketers often locate a number of ACDs of an ACD system near major metropolitan areas. However, during periods of overload calls may be handled through any ACD of the ACD system. As a result, the host or hosts of each ACD must be accessible from any agent station throughout the system.

While the interconnecting of hosts of ACDs works relatively well, the problem of access is difficult to administer. The difficulty often arises because of the need for security and because of a need of a user to access many different databases. Often the only way of providing access to the user into different databases of the system is to manually save a name and password of the user into each different host.

The need for the manual entry of authorization data to gain access to the different databases is slow and cumbersome. Because of the importance of ACDs and of interconnected computers, a need exists for a better method of providing access rights to users within such computer system.

SUMMARY

A method and apparatus for providing resource access to a user within a computer network of the automatic contact distribution system. The method includes the steps of providing a permission set that defines a limited set of features within the computer network that the user can access, the user signing into the computer network of the automatic call distribution system, the system retrieving the permission set for the user and the system providing the user with limited access to the computer system based upon the permission set.

BRIEF DESCRIPTION OF THE DRAWINGS

FIG. 1 is a block diagram of an automatic contact distribution system in accordance with an illustrated embodiment of the invention.

DETAILED DESCRIPTION OF AN ILLUSTRATED EMBODIMENT

FIG. 1 is a block diagram of a networked computer system 10 shown generally in accordance with an illustrated embodiment of the invention. Under the illustrated embodiment, the system 10 allows access to the various features of the system 10 based upon a set of extensible permissions assigned to each user. The permissions are extensible because the permissions are based upon a continuum of access rather than upon the firewall-related concept of access versus no access. Under one embodiment, the extensible permissions are embodied in a variable interface presented to each user based upon an extensible permission set. The interface is variable because the graphical tools provided to a user are dependent upon the rights and privileges that have been assigned to the user.

In general, the computer system 10 may be an automatic contact distribution system 10 having at least one host 12 that provides a unified command and control of one or more ACDs 14, 16 included within the system 10. The ACDs 14, 16 may be legacy or relatively new ACDs. In the case where the ACDs 14, 16 are a mix of conventional and legacy systems, a respective terminal adapter 18, 20 may be used to adapt the instruction sets and protocols of the ACDs 14, 16 to the host 12.

Each ACD 14, 16 may include one or more servers. Servers that may be included in each ACD 14, 16 may include automatic configuration servers 26, call or contact distributors 28, workforce management (WFM) servers 30 or quality management (QM) servers 32.

The host 12 may include one or more command and control servers 22. The servers 22 may be accessed by one or more desktops 24 operating on a PC connected to the host 12.

The host 12 and servers 22 may be used to provide administrative and control support for enhanced use of the ACDs 14, 16. For example, the ACDs 14, 16 may be located in remote geographic areas and process contacts with clients through a local connection to one or more communication systems (e.g., the PSTN, the Internet, etc.). As the calls are processed by the ACDs 14, 16, a supervisor working through the desktop 24 may monitor a call loading of the ACDs 14, 16. By being able to monitor a loading of each ACD 14, 16, the supervisor may detect overloaded agent groups, adjust the number of agents available for each call type, and even change a criteria for routing of calls among the ACDs 14, 16.

In order to adjust the number of agents available for each call type, the supervisor may need to first log into the various ACDs 14, 16. Once logged into an ACD 14, 16, the supervisor may be free to alter the size and content of the agent groups. In this regard, the supervisor may transfer agents among agent groups of an ACD 14, 16 or even alter the contact routing criteria that causes calls to be routed to any particular call group among the ACDs 14, 16.

Similarly, each ACD 14, 16 may include a local supervisor working through a desktop 34 (local supervisor 34) and a number of agents, also working through respective desktops 36. The agents 36 may receive contacts from clients through a local connection (not shown) to a communication system (e.g., PSTN, Internet, etc.).

In all cases, permissions may be based upon a permissions list associated with one or more access points through which the user logs into the system 10 or subsystem. For example, when the supervisor log into the system 10 through the desktop 24 (the supervisor and desktop hereinafter sometimes referred to as the supervisor 24), the UCC server 22 may download a user client 38 to the supervisor for display on the desktop 24. The user client 38 may request entry of a set of user credentials (e.g., name and password, token key, etc.). Once the supervisor 24 enters his/her credentials, the user client 38 may transfer the credentials to an access processor 40. The access processor 40 may compare the credentials with a set of locally stored credentials or may access a set of security features (e.g., a Windows security feature) to confirm that the supervisor has authorization to access the system 10.

In addition to confirming the authorization of the supervisor 24 to operate on the system, the access processor 40 may also retrieve a list of permissions 42. The list of permissions 42 may be a structure including a hierarchy of levels that define what the supervisor 24 is allowed to do within the system 10. For example, a first highest level of permissions may be a first set of features (e.g., a list of domains) that the supervisor 24 is allowed to access. Below the list of domains may be a second set of features (e.g., a list of servers) within each domain that the user is allowed to access. Below the list of servers may be a list of a third set of features (e.g., a list of data structures) that the supervisor 24 may access within each server. Below the list of data structures may be a fourth list of data access features that define what the supervisor 24 is allowed to do within that data structure. For example, the list of data access features may be programs that read the data and prepare reports. In this case, if the permissions list permits, then the supervisor 24 may be allowed to edit what is included within each report. On another level, the data access features may define whether the supervisor 24 is only allowed to read the data or is also allowed to enter, modify and/or delete data.

In effect, the permissions list may be used in any of a number of ways to facilitate access within the system 10. Under some illustrated embodiments, the permissions within the hierarchy may be affirmative and/or negative. In other illustrated embodiments, the permissions may be based upon a class or type of access, upon specific identifiers and/or upon descriptive identifiers of the system features to which the user is to be allowed access.

The list of permissions may be used by access processor 40 to display features of the system 10 to which a user is to be allowed access. If a user is allowed access to a feature, then that feature may be displayed in the form of an access option. If the user is not to be allowed access to a feature, then the access option may not be displayed on a desktop of the user.

For example, if the supervisor 24 is a system supervisor concerned with the operation of the system 10 as a whole, then the supervisor 24 may be able to access most features within the system 10. In this case, a portion of the permissions list 42 may contain an affirmative indication of "all" to indicate that the system supervisor 24 has access to all portions of the system 10. On the other hand, in a negative limitations portion of the permissions list 42, an indication of "passwords" may be provided to prevent access by the system supervisor 24 to other user's passwords. It should be noted in this regard that preventing the system supervisor 24 from accessing other user's passwords would not prevent the system supervisor 24 from resetting other user's passwords should the need arise.

During use, the access processor 40 may use the permissions list to display access options on the desktop of the supervisor 24. For example, once the system supervisor 24 signs into the system 10, then the access processor 40 may retrieve the permissions list 42 for the supervisor 24 and begin displaying access options (e.g., icons, menus, etc.) 46, 48 of the system 10 on the desktop of the supervisor 24.

In order to begin displaying access options 46, 48, the access processor 40 may send one or more system access queries to an LDAP server 44. Since the system supervisor 24 would have broad access to the system 10, the system queries may not be limited in any way. The LDAP server 44 may respond with a list of system identifiers. Included within the list of identifiers may be an identifier of each of the ACDs 14, 16 and also of any other servers present within the host 12.

In response to the list of ACDs 14, 16, the access processor 40 may generate and cause an icon 46, 48 of each respective identified system to be displayed on the desktop of the supervisor 24. If the supervisor 24 should activate the icon 46, 48 associated with the ACD 16, then an additional set of icons 46, 48 may be displayed representing the respective servers 26, 28, 30, 32 of the ACD 16.

On another level, another permission list 42 may also be provided for the local supervisor 34. In this case, the permissions list 42 may contain an affirmative permission for any system within the ACD 14 to which the local supervisor 34 is connected. The permissions list 42 may also contain negative permissions for at least some subsystems within the ACD 14.

For example, the local supervisor 34 may be given full access to the WFM server 30. Within the WFM server 30, the local supervisor 34 may perform a number of tasks directly related to resources (e.g., agents, agent groups, call routing parameters such as ANI, DNIS and/or URLs, etc.) of the ACD 14. The tasks performed by the supervisor 34 may updating resource information (e.g., add and delete agents from agent groups, create agent work schedules and amend as necessary, enter or change agent skills, etc.).

On the other hand, the local supervisor 34 may be given only limited access to the QM server 32. Limited access in this case may be accomplished within the permission list 42 by providing a hierarchy of systems to which the supervisor 34 is to be given access. In this case, the affirmative portion of the permissions list 42 may include an identifier of the QM server 32 followed by a concatenated list of identifiers of subsystems and data structures that the supervisor 34 is allowed to access. In this regard, the hierarch may have one or more paths from the highest level of the hierarchy. At the bottom of each path of the hierarchy free access may be given to any feature below the bottom level. On the other hand, access not provided to any parallel paths not contained within the hierarchy.

For example, the supervisor 34 would be required to enter the identifiers of new agents into agent lists of the QM server 32 for purposes of tracking the performance of new agents as well as to delete identifiers of terminated agents. The supervisor 32 would also be able to read the performance results of individual agents. The supervisor 32, however, would not be allowed to change performance results of individual agents. As a consequence, the permissions list 42 for the supervisor 34 would include a hierarchy that includes the QM server 32 with at least two paths leading from the QM server 32. One path would extend to an agent information server. Since the supervisor 34 would have full access to the agent information server, the permissions list 42 would not have any negative limitations regarding the agent information server.

The permissions list 42 may also have a second path from the QM server 32 to an agent performance reports server within the QM server 32. In this case, the supervisor 34 may be able to read and print reports, but would not be able to alter and save any report changes. Accordingly, in addition to an affirmative permission to access an agent performance reports server, the permissions list 42 may also include a negative limitation that prevents the supervisor from making changes to the reports server.

In this case, once the supervisor 34 logs into the QM server 32, the access processor 40 may provide an icon 46, 48 for accessing the agent information server and an icon 46, 48 for accessing the agent performance reports server. On the other hand, since the supervisor 34 would only have read access within the agent performance reports server, the access processor 40 would modify the toolbar present on the agent performance reports control screen. In this regard, since the supervisor 34 does not have write access, the control screen would not have a SAVE or any comparable softkey. In this way, the supervisor can read and print agent reports, but cannot alter the reports.

As another example, access to the system 10 by each of the agents 36 may also be controlled by a respective permissions list 42. In this regard, the agents 36 may have access to a database server 50 and a transactions server 52. The database server 50 may provide a searchable interface that allows agents to search for answers to questions posed by clients. The transaction server 52 may be used by the agents to record the substance of transactions with clients.

The agents 36 may also have read access to the WFM server 30. Access to the WFM server 30 may be provided to allow agents to track their scheduled working hours.

In this regard, the permissions list 42 of each agent would include affirmative limitations including the transaction server 52, database server 50 and the WFM server 30. However, the access may be limited in all cases. For example, the transaction server 52 may allow read and write access, but not deletions. The database server 50 and WFM server 30 may allow read, but not write. In each case, the permissions list 42 of each agent would include a delete negative limitation for the transaction server and a write and delete negative limitation for the database server 50 and WFM server 30. As above, these permissions may be implemented within the access processor by deleting the corresponding DELETE and/or WRITE softkeys from the toolbars of the agents in those cases where an agent 36 has reason to access the respective servers 30, 50, 52.

In another embodiment, the access processor 40 may be located within a browser 54 of a desktop used by a supervisor 24, 34 or agent 36. In this case, the access processor 40 may use the permissions file 42 to detect activation of softkeys that are not allowed by the permissions file 42 and delete any packets associated with the activation.

Under this embodiment, each time a supervisor 34 or agent 36 signs into the ACD 14, a respective icon 46, 48 will be presented on the desktop of the user 34, 36 for each server 26, 28, 30, 32, 50, 52. Each time a user 34, 36 activates an icon 46, 48 or element of a toolbar, the activity is compared by the access processor 40 with the permissions file 42. If the activity is not allowed by the activity file 42, then the action is canceled.

A specific embodiment of method and apparatus for controlling access within different domains of a computer system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of providing resource access to a plurality of users within a computer network of the automatic contact distribution system comprising: providing a respective extensible permission set assigned to each respective user of the plurality of users that defines a limited plurality of network features within the computer network that the respective user can access providing a continuum of access, wherein each respective extensible permission set is associated with at least one access point and includes a hierarchy of permission levels;

a respective user of the plurality of users signing into the computer network of the automatic call distribution system via one of the at least one access points; the system retrieving the respective permission set for the respective user in response to signing into the network; and the system providing the respective user with limited access to the computer system based upon the respective permission set and wherein the respective permission set is used to detect activation of softkeys that are not allowed by the respective permission set mad any packets associated with the activation are deleted in response to detection.

2. The method of providing resource access as in claim 1 wherein the respective permission set further comprises identifiers of a plurality of servers within the computer system that the user can access and is embodied in a variable interface presented to the respective user wherein the variable interface includes graphical tools provided to the user based upon the respective permission set.

3. The method of providing resource access as in claim 2 wherein the permission set further comprises of a plurality of features within at least some of the plurality of servers that the user can access.

4. The method of providing resource access as in claim 3 further comprising displaying a set of access options on a desktop of the user where each access option of the set corresponds to a respective server and/or feature of the computer system.

5. The method of providing resource access as in claim 4 wherein the display of access options further comprises displaying a set of icons, wherein each icon provides access to a different server within the computer network.

6. The method of providing resource access as in claim 4 further comprising the user selecting an option of the set of options and receiving access to a corresponding server of the plurality of servers and wherein the respective permission set is used to detect activation of softkeys that are not allowed by the respective permission set and any packets associated with the activation are deleted in response to detection.

7. The method of providing resource access as in claim 5 wherein the permission set further comprises a plurality of resources associated with each of at least some of the plurality of servers to which the user is allowed access.

8. The method of providing resource access as in claim 7 further comprising the user selecting an option of the set of options and receiving access to a corresponding resource of the plurality of resources associated with the at least some of the plurality of servers.

9. The method of providing resource access as in claim 8 further comprising defining the user as a supervisor of the automatic contact distribution system and the resource information being agent data selected from the group consisting of agent scheduling, agent skills, group assignments and passwords.

10. The method of providing resource access as in claim 1 further comprising the respective permission set having a first level of a list of domains that the user is allowed to access, a second level below the list of domains made up of a list of servers within each domain that the user is allowed to access, and a third level of a list of data structures that the user is allowed to access within each server on the list of servers.

11. An apparatus for providing resource access to plurality of users within a computer network of the automatic contact distribution system comprising:

a respective extensible permission set assigned to each respective user of the plurality of users that defines a limited plurality of network features within the computer network that each respective user can access to provide a continuum of access, wherein each respective set iris associated with at least one access point and including a hierarchy of permission levels;

means for signing a respective user of the plurality of users into the computer network of the automatic call distribution system;

means within the system for retrieving the respective permission set for the respective user in response to signing into the network; and means within the system for providing the respective user with limited access to the computer system based upon the respective permission set and wherein the respective permission set is used to detect activation of softkeys that are not allowed by the respective permission set mad any packets associated with the activation are deleted in response to detection.

12. The apparatus for providing resource access as in claim 11 wherein the permission set further comprises identifiers of a plurality of servers within the computer system that the user can access.

13. The apparatus for providing resource access as in claim 12 wherein the permission set further comprises of a plurality of features within at least some of the plurality of servers that the user can access.

14. The apparatus for providing resource access as in claim 12 further comprising means for displaying a set of access options on a desktop of the user where each access option of the set corresponds to a respective server and/or feature of the computer system.

15. The apparatus for providing resource access as in claim 14 wherein the access options further comprise displayed icons wherein each icon provides access to a different server within the computer network.

16. The apparatus for providing resource access as in claim 13 further comprising the user selecting an option of the set of options and receiving access to a corresponding server of the plurality of servers.

17. The apparatus for providing resource access as in claim 16 wherein the permission set further comprises a plurality of resources associated with each of at least some of the plurality of servers to which the user is allowed access.

18. The apparatus for providing resource access as in claim 17 further comprising the user selecting an option of the set of options and receiving access to a corresponding resource of the plurality of resources associated with the at least some of the plurality of servers.

19. The apparatus for providing resource access as in claim 18 further comprising defining the user as a supervisor of the automatic contact distribution system and the resource information being agent data selected from the group consisting of agent scheduling, agent skills, group assignments and passwords.

20. The apparatus for providing resource access as in claim 18 further comprising defining the user as a supervisor of the automatic contact distribution system and the resource information being contact routing data selected from the group consisting of ANI, DNIS, URLs and contact routing criteria.

21. An apparatus for providing resource access to a plurality of users within a computer network of the automatic contact distribution system comprising:

a respective permission set assigned to each respective user of the plurality of users that defines a limited plurality of network features within the computer network that the respective user can access to provide a continuum of access, wherein each respective permission set includes a hierarchy of levels of permission; a user terminal that signs a respective user of the plurality of users into the computer network of the automatic call distribution system; and an access program within the system that provides the respective user with limited access to the computer system based upon the respective permission set and wherein the respective permission set is used to detect activation of softkeys that are not allowed by the respective permission set mad any packets associated with the activation are deleted in response to detection.

22. The apparatus for providing resource access as in claim 21 wherein the permission set further comprises identifiers of a plurality of servers within the computer system that the user can access.

23. The apparatus for providing resource access as in claim 22 wherein the permission set further comprises of a plurality of features within at least some of the plurality of servers that the user can access.

24. The apparatus for providing resource access as in claim 22 further comprising a desktop that displays a set of access options on a desktop of the user where each access option of the set corresponds to a respective server and/or feature of the computer system.

25. The apparatus for providing resource access as in claim 24 wherein the access options further comprise icons.

26. The apparatus for providing resource access as in claim 25 wherein the permission set further comprises a plurality of resources associated with each of at least some of the plurality of servers to which the user is allowed access.

27. The apparatus for providing resource access as in claim 26 further comprising defining the user as a supervisor of the automatic contact distribution system and the resource information being agent data selected from the group consisting of agent scheduling, agent skills, group assignments and passwords.

28. The apparatus for providing resource access as in claim 26 further comprising defining the user as a supervisor of the automatic contact distribution system wherein the respective permission set contains affirmative and negative permission in a hierarchy of systems to which the supervision is given access including a concatenated list of identifiers of subsystems that the supervisor is allowed to access, the hierarchy having more than one path from the highest level for the hierarchy and the hierarchy giving free access to features below a bottom level of each path while not providing access to any parallel paths not contained within the hierarchy.

29. A method of providing resource access to a plurality of users within a computer network of the automatic contact distribution system comprising:

a respective user of the plurality of users signing into the computer network of the automatic call distribution system;

the system retrieving a respective permission set for the respective user of a plurality of permission sets wherein each respective permission set is associated with a plurality of access points and defines a hierarchy of permission levels of a plurality of network features that the respective user is allowed to access within the automatic contact distribution system to provide a continuum of access; and the system providing the respective user with limited access to the computer system based upon the respective permission set and wherein the respective permission set is used to detect activation of softkeys that are not allowed by the respective permission set mad any packets associated with the activation are deleted in response to detection.

* * * * *